(12) United States Patent
Larsson

(10) Patent No.: US 9,194,527 B2
(45) Date of Patent: Nov. 24, 2015

(54) SEALING PLUG

(71) Applicant: Lalmek Verkstad AB, Granna (SE)

(72) Inventor: Lars-Arne Larsson, Granna (SE)

(73) Assignee: Lalmek Verkstad AB, Gränna (SE)

( * ) Notice: Subject to any disclaimer, the term of this patent is extended or adjusted under 35 U.S.C. 154(b) by 0 days.

(21) Appl. No.: 14/401,710

(22) PCT Filed: Apr. 22, 2013

(86) PCT No.: PCT/SE2013/050429
§ 371 (c)(1),
(2) Date: Nov. 17, 2014

(87) PCT Pub. No.: WO2013/172765
PCT Pub. Date: Nov. 21, 2013

(65) Prior Publication Data
US 2015/0122363 A1    May 7, 2015

(30) Foreign Application Priority Data

May 18, 2012    (EP)  .................................... 12168474

(51) Int. Cl.
F16L 55/11      (2006.01)
F16B 25/00      (2006.01)

(52) U.S. Cl.
CPC ......... *F16L 55/1108* (2013.01); *F16B 25/0047* (2013.01)

(58) Field of Classification Search
USPC .................................................... 138/89, 92
See application file for complete search history.

(56) References Cited

U.S. PATENT DOCUMENTS

| | | | | |
|---|---|---|---|---|
| 3,094,894 A | * | 6/1963 | Broberg | 411/387.4 |
| 3,175,850 A | * | 3/1965 | Steczynski | 285/333 |
| 3,527,136 A | * | 9/1970 | Wilson | 411/423 |
| 3,978,760 A | * | 9/1976 | Muenchinger | 411/386 |
| 4,040,327 A | * | 8/1977 | Otaki | 411/423 |

(Continued)

FOREIGN PATENT DOCUMENTS

| | | |
|---|---|---|
| AU | 749289 B2 | 3/2000 |
| DE | 2 117 497 | 10/1972 |

(Continued)

OTHER PUBLICATIONS

International Search Report Corresponding to PCT/SE2013/050429 mailed Sep. 11, 2013.
Written Opinion Corresponding to PCT/SE2013/050429 mailed Sep. 11, 2013.
International Preliminary Report on Patentability Corresponding to PCT/SE2013/050429 mailed Apr. 3, 2014.

*Primary Examiner* — James Hook
(74) *Attorney, Agent, or Firm* — Davis & Bujold, P.L.L.C.; Michael J. Bujold

(57)    ABSTRACT

A plug (1) for sealing a hole (2) provided in a work piece (3). The plug (1) comprises a front part (4) and a sealing part (5), and the surface hardness of at least the sealing part is greater than the hardness of the work piece (3). The sealing part (5) is conical and has an increasing diameter, in a direction from the front part (4) and the sealing part (5) comprises a cutting thread (6). The profile of the cutting thread (6) comprises a sharp tapered top (7), two adjacent flat flanks (8), and a bottom (9) of the thread (6). The sharp tapered top (7) is formed by the two flanks (8) which meet at a common intersection point. An angle ($\alpha$, $\gamma$) between the flanks (8) is between 110-160° while transitions between the flanks (8) and the bottom (9) are smooth.

20 Claims, 3 Drawing Sheets

(56) References Cited

U.S. PATENT DOCUMENTS

| | | | |
|---|---|---|---|
| 4,503,934 A | | 3/1985 | Stephanus et al. |
| 5,340,254 A | | 8/1994 | Hertel et al. |
| 5,701,935 A | * | 12/1997 | Vasudeva .................. 138/89 |
| 6,062,263 A | * | 5/2000 | Donovan et al. ........... 138/89 |
| 6,116,285 A | * | 9/2000 | Wilson ....................... 138/89 |
| 6,142,186 A | * | 11/2000 | Donovan .................... 138/89 |
| 2001/0054800 A1 | | 12/2001 | Trichard |
| 2010/0196121 A1 | | 8/2010 | Karupaya |
| 2014/0236245 A1 | * | 8/2014 | Hainard .................... 606/291 |

FOREIGN PATENT DOCUMENTS

| | | |
|---|---|---|
| DE | 28 45 072 A1 | 4/1980 |
| DE | 20 2008 012 210 U1 | 1/2009 |
| EP | 0 951 626 B1 | 3/2005 |

* cited by examiner

SEALING PLUG

This application is a National Stage completion of PCT/SE2013/050429 filed Apr. 22, 2013, which claims priority from European patent application serial no. 12168474.0 filed May 18, 2012.

FIELD OF THE INVENTION

Present invention relates to a self-sealing plug for sealing holes in a work piece or the like. The invention can be applied in a number of branches where there is a need of sealing of holes that are made with an almost circular cross section, as for instance drillings, and preferable in devices that are exposed to high pressures. The plug is however not suitable for sealing of thin-walled constructions.

BACKGROUND OF THE INVENTION

By certain production/manufacturing methods there is a need of interior machining of a work piece, to more or less complicated internal geometries, for example by manufacturing of valves, engine blocks hydraulic details and the like. Then a need of temporary hole-makings often arises, for access to drill, mill or in another way machine, the interior in those spaces that has to be machined, to intended geometry. After the interior geometries are machined, the temporary made holes, in several cases, must be sealed. For applications exposed by low pressures, fluid pressures, or air pressures, there are a lot of solutions for the sealing of the holes. On the other hand for high pressures, especially in the range of 100 bar and above, there are few solutions that are able to give a satisfactory sealing. There are known constructions for these high ranges of pressure where the solutions foremost are of the type expanding plug of metal, provided of a cylindrical sleeve and some form of core inside the sleeve, or which can be introduced in the same. A frequent solution is a plug of the art pop rivet, with a cylindrical sleeve with a through shaft for engagement with a special tool, which by activating grips the shaft and moves the shaft in relation to the sleeve, whereby the wedge shaped part of the shaft enters the sleeve, and accordingly the sleeve expands outwards to the walls of the hole that surrounds the plug. The sleeve often comprises some form of ribs at its outside, and further the sleeve is usually of harder material as the material that has to be plugged. By the expansion the walls of the hole are deformed plastically whereby a sealing is obtained between the plug and the wall of the hole.

Other types of expanding plug that works in a similar way, consists of a sleeve, whose one end has a bottom and the other end an opening, and where the sleeve is provided with ribs at its outside. The bottom also works as a guide for the plug by the entry of the plug in the hole that has to be sealed. At the opening of the sleeve a ball is provided to be pressed into the sleeve. By means of a special hammer or a special stop the ball is knocked into the sleeve that than expands, whereby the sleeve engages in the walls of the hole by that those at the same time are plastically deformed and a satisfactory sealing is obtained.

A third type of expanding plug is constituted only of a cylindrical sleeve with a guiding bottom at its one end and an open side at its other end, and some sort of ribs provided at the outside of the sleeve. Instead of a ball as expanding driver a tool is used directly in the opening of the sleeve, where the plugging is performed by that the tool is knocked into the adapted opening in the sleeve, whereby the sleeve is urged to expand outwards to the walls of the hole and a sealing is obtained.

There is also a solution according to EP 0951626, which offers an improved sealing plug or a fastening element to a usual standard, a so called NPTF-thread. A NTPF-thread is types of thread developed in USA according to national standards, and are known in the range of pipe plug threads and NPTF stands for National Pipe Thread Standards-Fuel and Oil. The NPTF-thread is a conical designed thread that is used in a before thread-cut pipe or work piece, which pipe or work piece first is prepared with drilling of a hole with parallel walls, which thereafter are broached to achieve a conical hole. According to the patent the standard thread (NPTF) gives a first sealing by deformation of the tops of the inner and outer thread, but no satisfactory sealing is obtained against for instance creeping leakage of fluids based of capillary effects and additionally there is a risk of so called cross threading which can result in an untighten thread. To overcome those disadvantages a plug according to the patent is invented with partly a threaded part and a second sealing part with several different forms of embodiments. The second sealing part is provided at the front end of the plug, while the threaded part is provided at its back end. Between those parts there is a middle part. The thread is designed as a standard type of cutting thread, which must bring about the so called NPTF-thread and the hole that it has to seal must be broached to a conical shape before the plugging can be done. The second part, the sealing part on the other hand has no thread, the sealing is obtained by that the plug is driven in by the above mentioned thread to such depth that the second sealing part grips and bites in to or deform the smooth broached and conical wall of the hole. The sealing part is constituted of a ring or rings, or only a bulb or straight or conical end part which by driving in deforms the wall of the hole and causes a sealing by the material that "swells out" in front of the sealing part.

SUMMARY OF THE INVENTION

Technical Problem

The problem with the known solutions is that all solutions demands relative small tolerances in respect of the hole, which has to be plugged, both in respect of its roundness an in respect of its dimensions. Additionally some of the known constructions comprise two or more details that mutually also demands an accurate precision to be able to mutually cooperate, which makes the manufacturing costs for the plugs rather high. Furthermore the known solutions demands special tools for expanding the plug. Further, the known solutions have disadvantages regarding dismounting of the plugs, while it is necessary that they are drilled out, for removing the plug. The drilling results in that residues from the plug or borings easily is left in the interior space in the work piece, and if the hole will be provided with a new plug the hole must once again, a little larger, maintain the high demands on tolerances of the surface and the roundness of the hole.

The disadvantages with the solution according to EP 0951626 are several. On the one hand there are, exactly as is described above, the disadvantages relating to the tolerances and the finishing of the hole, while the hole that is drilled for access to diverse interior finishing steps, before the plugging has to be smooth broached to a conical hole with fine surfaces, and on the other hand the manufacturing of the plug will be relatively costly depending on the high demands on both the cutting thread and on the additional sealing part, which has an advanced geometry.

Solution to Problem

Technical Solution

With the now present invention the aim is obtained to solve those problems, by a simple, cost-efficient solution without the disadvantages as in the prior art. The invention comprises a plug in one piece, which firstly includes a front part—the part that at first is introduced in the space of the hole, which front part preferable is designed for guiding and centering the plug in the hole. The front part is then followed by a sealing part, which in relation to the direction of the driving into the hole is arranged after the front part. At least the hardness of the surface of the sealing part, the material hardness of the sealing part or the material hardness of the whole plug is selected in a way that it is harder than the material in the working piece that has to be plugged. The distinguishing characteristics of the plug are that the sealing part is conical with an increasing diameter in direction from the front part, i.e. diametrical driving in direction and that the sealing part includes a cutting thread. Furthermore, the profile of the cutting tread comprises a sharp tapered top, formed by that two flat flanks meet in a common intersection point, and the flanks are flat by that an angle between the flanks is between 110-160°. The transitions between the flanks and the bottom of the thread are smooth. The plug can easily be adapted for manufacturing in different dimensions fitting to different dimensions of holes. For a certain diameter of holes the front part of the plug is adapted in a way that its diameter is slightly smaller than the holes diameter. That implies that it is easy to adapt the front part in the hole that has to be plugged. The conicity, with increasing diameter from the front part and to the other end, implies that the sealing part, by turning of the plug after adaption of the front part, almost immediately contacts the surrounding walls of the hole, and the thread of the sealing part grips thereby also in the surrounding surface. The thread itself feeds the plug into the hole by that the plug is screwed in the direction of the driving of the thread, whereby the thread cuts into the walls of the hole, whose material flows out and fills the shallow thread. Hereby a sealing is obtained between the plug and the walls of the hole. The tapper also makes that the thread grips at least somewhere along the path of the thread, relatively soon after the driving in has begun, which makes that already after a few turns a sealing is obtained. In relation to prior art there is firstly no need of either an outer thread in the hole, which is needed for the above mentioned NPTF-thread, nor a broaching of the walls of the hole to a smooth and/or conical surface, with small tolerances, just normal bore tolerances are enough. In addition there is no need of a first and a second sealing according to EP 0951626, which makes the manufacturing more expensive. A further advantage is that the plug can be dismounted without drilling out the material of the plug, which is the case by the expanding plugs; on the contrary the plug is screwed out by disassembling.

According to a preferred embodiment of the invention the cutting thread of the sealing part comprises a new profile, with a thread top that is sharp pointed. The thread top is formed to a sharp pointed shape by that the thread flanks are concave with a tested out radius of curvature. The method to produce the thread, at small series, is conventional by that a cutter cuts the thread during rotation of the plug blank at the same time as the plug or cutter is moved in axial direction. But the difference is that the thread flanks are formed by that a rounding in the cutter cuts out the flank of the thread which gives the flanks a radius, and accordingly a sharp thread top is formed together with the flank of the next turn. The thread top will accordingly be very sharp by that the respective radius of the flank of the thread profile or thread top meets in an intersection in the thread top. The sharp thread top cuts into the wall of the hole in a way that is efficient and uses a less power, resulting in that only hand power or for instance a handheld electric, pneumatic or hydraulic tool, depending on the plug diameter, is enough to drive in the plug into the hole and to seal the same, unlike the majority of the older solutions. By larger series the same technique is used as by manufacturing of for instance screws, but in a way that the thread gets its design as is described above.

According to a further preferred embodiment the thread bottom constitutes a continuous continuation of the rounding of the flanks with the same continuous radius as the flanks. To achieve the smooth radius, which extends the whole way between two adjacent thread tops, a rounded and symmetrical formed cutter is used for the cutting of the thread. By cutting out, in a conventional way, according to above, the thread, but with the rounded cutter, it is obtained that partly the above described radius of curvature of the flanks and the forming of the sharp point and partly that the bottom of the thread constitutes a continue, a continuous radius, between the two most adjacent thread flanks and thread tops. By larger series the same technique is used as by manufacturing of for instance screws, but in a way that the thread is given the above described design. Besides the above mentioned advantages relating to the sharp thread top, the combination between the sharp top, a continuous radius from the thread flanks and running over to the bottom of the thread, implies that the material in the walls of the hole, where the cutting of the thread occurs, flows out equally around the point, along the flanks and downwards towards the bottom of the thread. The effect from this is that a very good sealing is obtained between the thread and the surrounding material in contrast to older conventional cutting threads, with more or less sharp changeovers between flanks and thread bottom, with a risk of forming of holes and possible creep distances for fluid under pressure for instance. Together with the conicity the thread bottom is filled with thread cut, cold formed material from the wall of the hole, already after a short cut distance along the threaded path, which not occurs in older solutions.

The next above mentioned embodiment can be modified in a way that the radius of curvature of the flanks is maintained, but to let those pass over in a straight thread bottom, where appropriate. This can for instance be done by that the rounded cutter has a chamfered part arranged to form the straight thread bottom. The length of the chamfered part is determined by the design of the cutter or, at larger series, the technique that produces the thread.

According to a preferred embodiment of the invention the radius of the flanks of the thread together with the position of the intersection there between, i.e. the position on the thread top, is such that the angle between the tangents of the flanks in the intersection is between 110-160°, preferable around 145°. This gives a very flat thread profile that together with the sharp thread top gives a very good plastically deformation of the surrounding material and a good sealing is obtained. Conventional threads, both cutting, as well as usual metric threads and the like, has a so called profile angle of approximately 60°, some sorts, also has 30°. The profile angle is the angle between the straight flanks on both sides of the thread top, and compared to the thread flanks of the now present invention, the difference in angles is large. Despite that the thread according to this embodiment don't have straight flanks it's obvious that the thread has a very much more flat thread profile than occurring standard threads, and accordingly another and more advantageous thread forming and other sealing properties than existing technique. Despite the flat profile the plug is anyway, similar to the standard thread, dismountable by that it only has to be screwed out in a direction opposite to the driving in direction.

According to a preferred embodiment the thread of the sealing part has straight thread flanks but with a very flat profile angle, compared to a normal thread. The profile angle is between 110°-160° and preferable around 145°, which means that the flanks of the thread are very slightly inclined. The straight and flat flanks of the thread on both sides of the thread top ends in a sharp thread top, provided for the thread cutting. The positive features for this embodiment are similar the above mentioned, and the straight flanks can very well be combined with both a curved shaped and a straight thread bottom, and accordingly the positive features that are described together with the above embodiment are obtained as a whole.

To achieve a thread top that is as sharp as possible in the next above embodiment, with the flat and straight thread flanks, the outer diameter of the thread has to, as far as the manufacturing method admits, coincide or at least almost be equal with the distance between the tops of the theoretical triangle that in nomenclature of threads is called base triangle. The height of the base triangle by a normal thread is equal to the height of the sharp triangle that theoretical forms the triangular shape of the thread. The real "triangle" normally has a chamfered/planed bottom and top depending on pure manufacturing technical and for other reasons. In the now present invention it is foremost intended that the outer diameter, from thread top to thread top on both sides of the symmetry axis, as far as possible, is equal with the distance between the tips on the "theoretical" triangle, the base triangle in the thread profile. Further on also the thread top corresponds, by design to the top of the base triangle, i.e. it is very sharp, which is advantageous according to what is mentioned in the above embodiments.

A preferred embodiment is that the thread depth of the thread is considerable smaller than a thread depth of a normal thread. A normal thread usually has a thread depth, from the bottom of the thread, around for instance 0.8 mm, but according to the invention it is preferred that the thread depth is less than 0.15 mm. Also here it is obvious that the thread differs considerable from older technique considering the thread depth—the thread is very shallow. As seen with the naked eye the thread grooves are nearest interpreted as weak or diffuse, whereby it is not obviously that it is a thread that is examined. The shallow thread, which is described here for clarity only for small scale manufacturing, is mostly advantageous achieved by that a rounded cutter is used, according to above, but that this only cuts in the surface of the plug down to a depth of maximal 0.15 mm. By the rounded cutter a continuous radius is obtained that reaches from thread top to thread top, with the advantages regarding radial thread bottom, radial and conical thread flanks that ends out in a cutting and are forming a very sharp thread top, that is already described above, and together with the shallow thread depth, the material flows out very well and fills the thread groove already at a short distance—a very tight and simple thread construction is obtained without a need of further sealing rings and the like. Taken together the very flat thread profile implies together with the shallow threads that a very good sealing is obtained already after a few turns of driving in the plug. By that the sealing part is in addition conical, has a harder surface than the material that has to be plugged, and comprises a cutting thread with a very flat and shallow thread profile, the plug is able to seal against very high pressures, and a test up to 1100 bar has showed that the plug is tight. When a device for instance is exposed to a fluid pressure the problems that are described above arises concerning leakage via creeping through/along the thread paths. This is avoided in the new solution by that the threads are shallow and flat, which implies that the eventually fluid that creeps in at the first turns of the thread, already here, however only in very small quantities, depending on the limited space, rapidly decreases in quantity and pressure, while the fluid is not able to creep in between the threads when the space is decreased successively between the thread valleys and the surrounding surface. And by the conicity the possibility for creeping is ceased, already after some or a few thread turns. By this advantageous embodiment the plug can manage very high pressures.

According to a further preferred embodiment the conicity on the sealing part is tested out with a preferred cone angle, in relation to a centre axis of the plug, of up to 6°, preferable between 2-3°. The cone angle together with the shallow and cutting thread makes that the plug easily can be applied with hand power, for instance with hand tools as an Allen key, torx, nut driver or the like. The sealing parts as is described above arranged after the front part and the front part has of course an adapted diameter, which is slightly smaller than the diameter of the bore hole. For instance for a 8 mm bore hole, preferable the diameter of the front part is 7.95 mm. While the sealing part is conical, with its narrowest part closest to the front part, and widening outwards to the back end, the thread rapidly comes in engagement with the walls of the hole and begins to cut a thread into this. Because of the tested out cone angle the power to rotate the plug for the driving in isn't larger than that the work can be done with hand power, but still the plug will be sealing already after e few turns of driving in into the hole. The cone angle makes that normal bore tolerances in the bore hole are sufficient, i.e. broaching is not needed like in prior art, and this because the engagement between thread and walls of the hole always occurs already along a part length of a turn of the thread path. When an engagement already is achieved in an area, this engagement proceeds along the thread path afterwards and accordingly the fully sealing is obtained already after a short driving in into the hole.

Particularly preferred thread depth, from the thread bottom to the thread top is between 0.05-0.1 mm. As mentioned above the thread depth is adapted for a adequate function regarding the driving in or the plug, but foremost regarding the sealing, and tests has showed that a thread depth around a tenth part of the thread depth of normal threads are particularly advantageous.

According to a preferred embodiment an adequate sealing is obtained by that the conical sealing part with its thread has at least an axial length that corresponds to three turns of thread pitch, which means that by driving in the plug by turning, at least three whole thread turns cuts into the walls of the hole. Preferable the length of the sealing part is adapted in a way that between 3-10 thread turns will be in engagement with the surrounding walls by the sealing of the intended hole. Depending on the design of the conical sealing part of the plug with the sharp, shallow thread with flat thread flanks and the shallow thread profile, a good sealing is obtained to high pressures already after short axial distance, without a risk for leakage similar to conventional thread sealing solutions. There is also no need of double sealing parts according to the above described known solutions.

According to a preferred embodiment the plug includes a recess which is provided for a tool for the mounting of the plug and for the dismounting. The recess is preferable provided in the sealing part and is easily adapted to the tool that will be used in respective application, for instance torx, Allen keys, helicoidal groove, crosshead etc. The invention is not limited to include only hand tools but it can just as well be a machine held tool. Compared to the known solutions of expander art, for instance where the plug expands through the use of different forms of impact devices the risk of damages on the surrounding material around the hole is considerable less in the preferred embodiment.

According to a further embodiment the plug includes a grip, provided for gripping tools such as for instance an adjustable wrench, socket wrench or the like, instead of the recess according to the above embodiment.

The diameter of the front part is as mentioned before slightly smaller than the diameter of the drilled hole, because the front part has to guide and centre the plug in the hole during mounting. According to a preferred embodiment of the invention the sealing part follows immediately after the front part without any intermediate part and the smallest outer diameter of the thread is equal with the diameter of the front part. When the sealing part is slightly tapered this will grip in the wall of the hole short after the driving in or screwing in has begun, because the thread cutter nearby the front part has the same diameter as the front part and the sealing effect is achieved.

An alternative to the above embodiment is that the conical sealing part connects immediately to the front part, but the smallest outer diameter of the thread is smaller than the diameter of the front part, and is increased thereafter with the conicity. This means no difference for the driving in of the plug in the wall of the hole, it only permits that a continuous thread path already is in "power" when the outer diameter of the thread is equal to the diameter of the front part depending on the conicity. The start of the thread begins in other words "in protection of" the front part.

Advantageous Effects of Invention

Advantageous Effects

By the invention a number of advantages compared to known solutions are obtained:
The sealing plug manages very high fluid pressures without a leakage, either from direct leakage or by creeping leakage via the thread paths.
Normal bore tolerances are sufficiently for the hole that has to be sealed, i.e. no need of finishing of the surfaces of the bore hole.
Easy mountable because of guiding front part and self-cutting thread designed in a way that the plug can be mounted with hand tools.
Easy dismountable without needs of drilling out the hole.
Cheap production and easy to be adapted for all interesting sizes of holes.

BRIEF DESCRIPTION OF THE DRAWINGS

Description of Drawings

Figure 1:
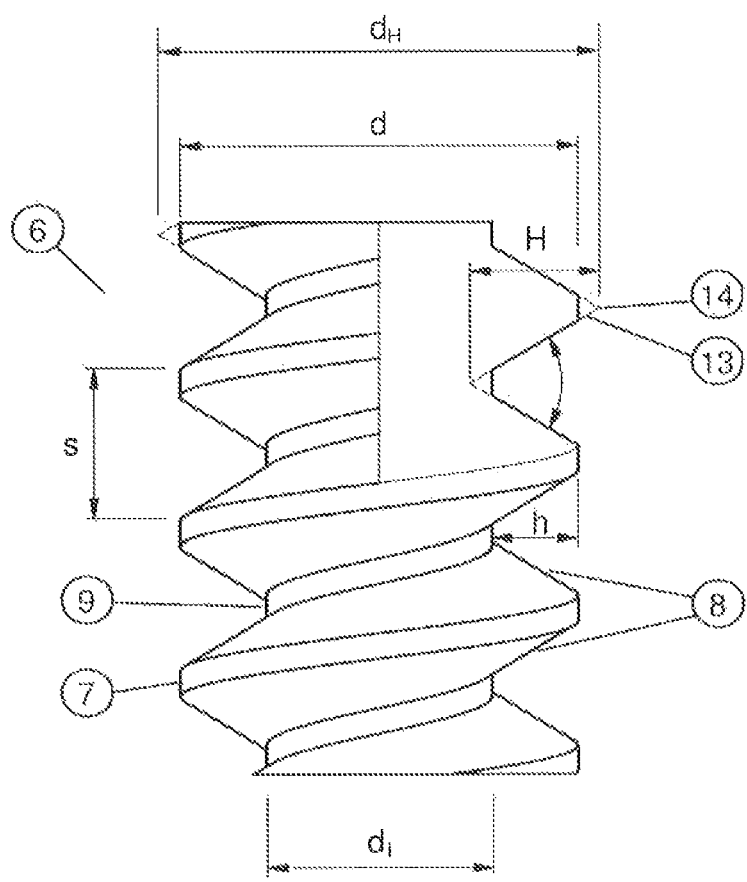

FIG. 1 shows a principal view of a normal thread with some usual definitions.

Figure 2A:
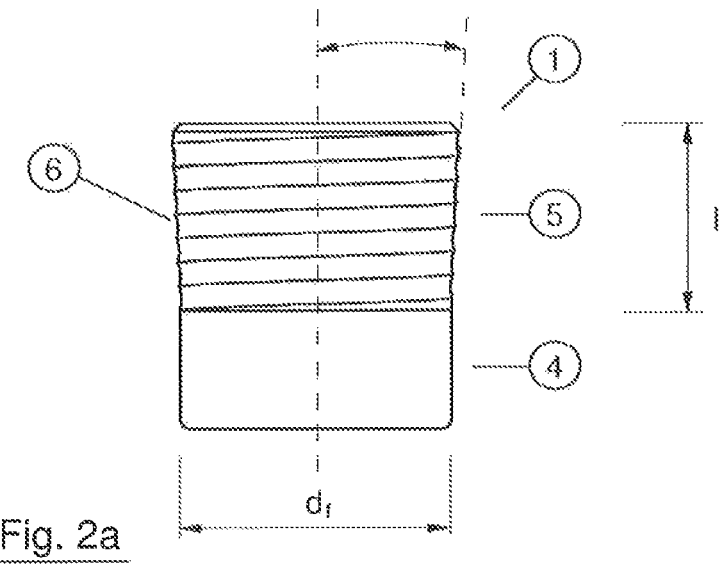
Figure 2B:
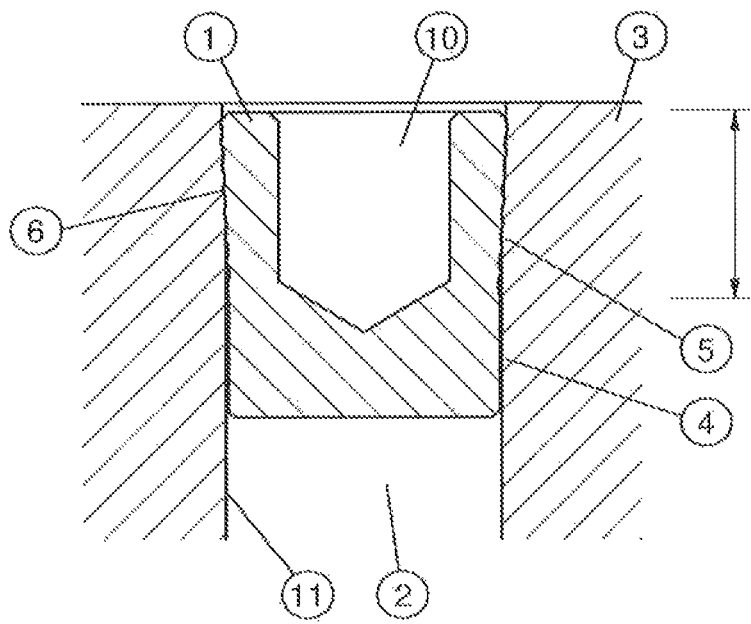

FIGS. 2a and 2b shows a preferred embodiment of the plug in view and section, and the engagement between plug and wall of the hole.

Figure 3A:
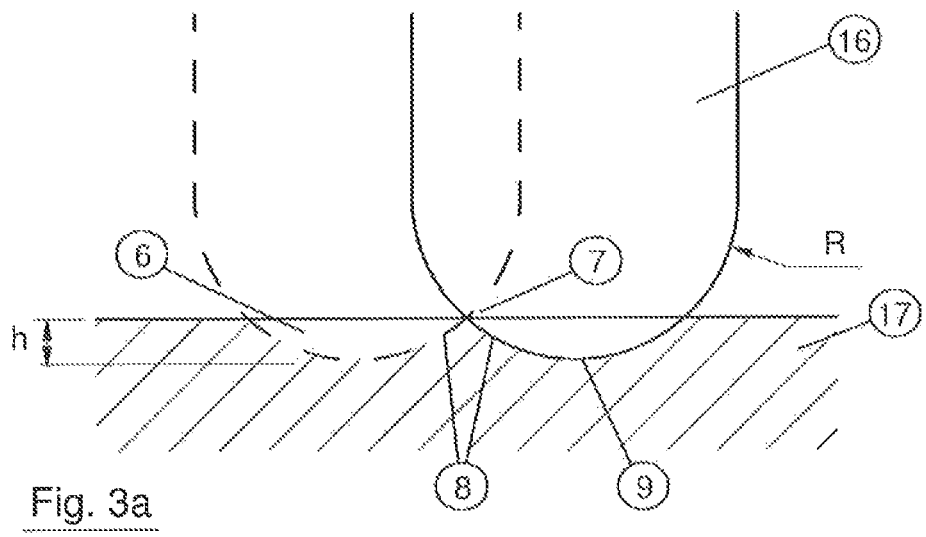

FIG. 3a shows the cutting-out of the thread of the plug blank by means of a rounded cutter.

Figure 3B:
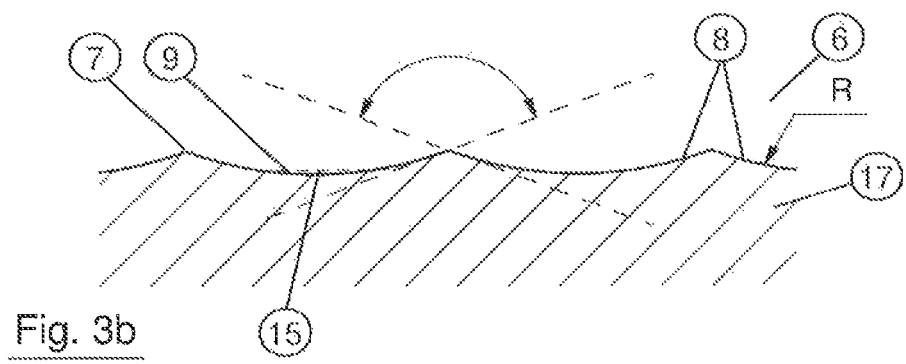

FIG. 3b shows a detail section of the preferred embodiment of the profile of the thread, with radial thread flanks.

Figure 3C:
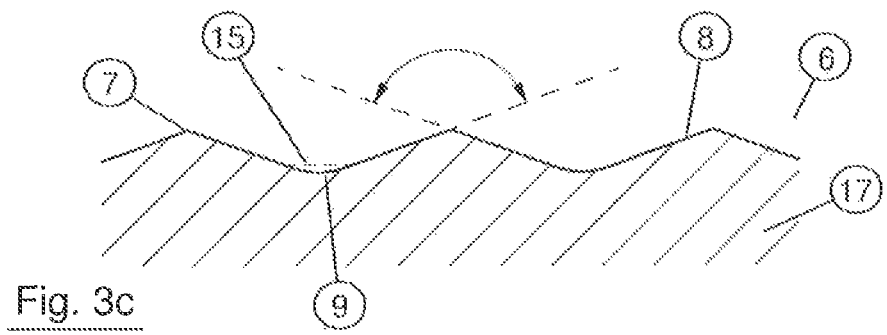

FIG. 3c shows an alternative embodiment of the thread profile with straight thread flanks.

DETAILED DESCRIPTION OF THE PREFERRED EMBODIMENTS

Best Mode

The constructive design by the present invention is obvious in the following description in detail of an example of embodiments of the invention related to the accompanying figures showing a preferred, but not limited example of embodiment of the invention. In addition the invention forwards the prior art in the field in different respects. This is realized in the present invention by that the device of the below described art principally is constituted in a way that is obvious from the characterised part of claim 1.

Mode for the Invention

Detailed Description of the Drawings

FIG. 1 shows a principal view of a normal thread 6, the thread profile of which is formed of a continuous cut-out thread path, running as a screw line around a cylindrical centre piece with a certain axial movement per turn, called screw pitch s. The diameter of the cylindrical centre piece is designated inner diameter $d_i$. The thread profile itself is normally constituted of a cut-out like a triangle with a thread top 7, and on respective side of the thread top 7, two thread flanks 8, and between two adjacent thread triangles a thread bottom 9. Normally are both the thread top 7 and the thread bottom 9 more or less chamfered/rounded depending on manufactory reasons or other reasons, and accordingly differ the profile from the theoretical triangle form, which is called the base triangle 13 of the thread. The height of the base triangle 13 is designated base triangle height H, while the real height of the thread, between the thread bottom 9 and the thread top 7, is designated thread depth h. In the same way differ usually outer diameter $d_H$ of the base triangle, i.e. the, related to the symmetric axis, perpendicular distance between the tops 14 of the base triangle, from the real outer diameter d of the thread 6, which is the, related to the symmetric axis, perpendicular distance between the real thread tops 7. The profile of the thread 6 is also determined by the so called profile angle α, which is the angle between the straight thread flanks 8. The profile angle α for the normal threads usually are around 60°, but there are also threads with first of all sharper thread profile smaller than 60°.

FIG. 2a shows a preferred embodiment of a plug 1, according to the invention. The plug 1 has a cylindrical basic form with a front part 4 and a sealing part 5 and according to FIG. 1 the mounting direction is downwards in the figure whereby the front part 4 first entries a hole 2 that will be sealed. The front part is adapted to the respective size of hole, regarding the hole 2 that will be sealed/plugged, and preferable there is an assortment of plugs for the occurring sizes of bores that are used by the applications where the invention is especially interesting, normally in sizes of holes up to 20 mm. The diameter $d_f$ of the front part 4 is slightly smaller than the diameter of the hole 2 that will be sealed. For instance for a bore hole with a diameter of 8 mm the diameter of the front part 4 is 7.95 mm. By that the main function of the front part 4 is obtained—a guiding and centring function, by the mounting of the plug 1. Preferable the front part 4 also includes a rounding at its front end. According to the preferred embodiment the sealing part 5 follows immediately after the front part 4, but it is clear that it just as well can be provided a middle part arranged between the front part and the sealing part. The sealing part 5 has a slightly tapered design with its narrowest part closest to the front part 4 and in addition the sealing part 5 comprises the cutting thread 6 beginning at the changeover between the front part 4 and the sealing part 5. The conicity is tested out to give a rapid sealing along the thread path in interaction with the design of the thread 6, at the same time as the plug 1 will be screwed in into the hole 2 by hand power or hand tools. A preferred cone angle β of the sealing part 5, related to the symmetric axis of the plug, is between 0-6°, but preferable the angle within the narrower interval is 2-3°. The length of the sealing part comprises at least three whole turns of the thread but preferable between 3-10 thread turns.

FIG. 2b shows a section through a work piece 3, the plug 1 and the hole 2, which hole has to be sealed by means of the plug. As is seen in the figure, and as is mentioned above the diameter $d_f$ of the front part is slightly smaller than the diameter of the hole 2. The external surface or all of the material in the plug 1 or at least the sealing part 5, is of harder material than the material of the work piece 3. According to the preferred embodiment the thread path of the thread 6 begins in connection with the changeover between the cylindrical front part 4 and the changeover to the cylindrical and conical sealing part 5. The latter has, so to speak, the form of a truncated cone separate regarded. The conicity is very light, with the cone angle β of 2-3°, between the symmetric axis of the plug 1 and the side of the cone. According to the figure the plug 1 driven in/screwed in into the hole 2 to a final position, where a fully sealing is obtained by that the thread 6 of the plug is cut in into a wall 11 of the hole. The conicity of the sealing part 5, with increasing diameter from the front part 4 and to the other end, implies that the sealing part 5, by turning/screwing in the plug 1 after fitting in the front part 4, almost immediately contacts the surrounding wall 11 of the hole, and the thread 6 of the sealing part 5 grips thereby also in the wall 11. The thread 6 itself feeds the plug 1 into the hole 2 while the plug 1 is screwed in the direction of the thread, whereby the thread 6 cuts into the wall 11 of the hole 2, which so to say is thread-cut, and the material of the wall flows out around the thread 6 depending on that the thread is cutting and is also harder than the wall 11 of the hole. The material fills rapidly out the shallow thread depth, both owing to the preferred, flat thread flanks 8 and that the thread 6 is so shallow, see FIG. 3 with description. With this a very good sealing between the plug 1 and the wall 11 of the hole is obtained. The conicity also makes that the thread 6 grips at least somewhere along the thread path, relatively soon after driving in has begun, which implies that already after some turns a sealing is obtained. An axial length I of the sealing part 5 is chosen in a way that at least three whole thread turns has the possibility to grip completely in the wall 11 of the hole and to cut into the same and its material fills out the thread path of the thread 6. Preferable the sealing part 5 includes between 3-10 whole thread turns, to permit that a completely sealing is obtained. The plug 1 also includes a recess 10 provided for engagement with a tool, for instance an Allen key, torx, crosscut chisel or other therefore suitable tool. Of course it is within the idea of the invention that the plug can be adapted for another suitable tool, for instance a box spanner or an adjustable wrench, that can grip around one at the plug provided head. By that the plug 1 is thread cutting the plug can also be dismounted with the same simple handling as by the driving in, by the hand tool and out screwing of the plug 1. The advantage compared to expanding plugs of known types is that the screwing out of the plug 1 according to the invention do not leave residues of the plug nor in the hole 2 or in the inner space inside the hole, which easily occurs, for instance by drilling out an expanding plug.

FIG. 3a shows a principle of how a rounded cutter 16 cuts into a plug blank 17 by the forming of the thread 6 of the plug 1, according to the preferred embodiment the thread top 7 is formed by that the cutter 16 cuts out the thread 6 during rotation of the plug blank 17 at the same time as the plug 1 or the cutter 16 is moved in axial direction. But by that the cutter 16 is rounded and with a tested out radius (R), the thread flanks 8 of the thread 6 will be radial/concave and those forms a sharp and pointed thread top 7 where the radius of the respective thread flank meets in an intersection in the thread top 7. Of course it is understood that the manufacturing method can be varied depending on the size of the production run and the above and below descriptions of the manufacturing technique with cutters shall accordingly only be seen as example of possible manufacturing technique. The thread 6 isn't like conventional threads, which often are made of symmetrical triangular forms, more or less with truncated thread tops and thread bottoms, somehow deviant from that by a theoretical base triangle 13, see FIG. 1. The tip of the thread top 7 is here very sharp and nearby a theoretical tip of a base triangle, and this by manufacturing it according to the above. The new thread profile is additionally very shallow compared to conventional thread profiles with a thread depth h of between 0.05-0.1 mm, and the thread bottom 9 with a deviate look from the pointed thread top 7. While the thread top 7 is very sharp and the thread profile in addition is very shallow the thread 6 cuts in efficiently and with less power into the wall 11 of the hole, see FIG. 2b. This makes that the plug 1 is driven into the hole 2 only by means of hand power to a sufficient depth, to achieve a fully sufficient sealing.

FIG. 3b shows a section in detail of the preferred embodiment of the thread profile, with radial thread flanks 8. As the cutter 16 has a round and radial form, down to at least the depth of the cutting-in in the plug blank 17, the thread bottom 9 of the thread 6 is formed as a continuation of the radial thread flanks 7, and the thread bottom 9 together with two tread flanks 8 on both sides of the thread bottom 9, ranges as a continuous radius (R) between two adjacent thread tops 7. A possible alternative for the embodiment to this is that the cutter 16 has a straight section, centric placed at its point, whereby a straight thread bottom 9, a chamfered part 15, is formed between two radial thread flanks 8, according to the dashed line in the figure. In the intersection between two thread flanks 8 is as before mentioned the sharp thread top 7 formed. The angle between the two tangents of the flanks 8 in the intersection, here called a tangent angle γ, is 110-160°, and particularly preferred about 145°, i.e. the thread flanks 8 are very flat. As is mentioned above this is particularly efficient, together with the sharp thread top 7, and the conical form of the sealing part 5, to on one hand draw in the plug 1 with less power and on the other hand to obtain a very good sealing.

FIG. 3c shows an alternative embodiment of the thread profile with straight thread flanks 8. Also this alternative embodiment is built on that the thread top 7 is made as sharp as possible according to selected manufacturing method and that the thread flanks 8 are very flat, with the so called profile angle α between 110-160°, and that the thread 6 is very shallow, under 0.15 mm and particularly preferred 0.05-0.1 mm. the thread bottom 9 has a suitable rounded form, by a radial changeover from the thread flanks 8, alternative as above the thread 6 has the chamfered part 15, which constitutes the thread bottom, according to the dashed line in the figure.

PARTS LIST

1=plug
2=hole
3=work piece
4=front part
5=sealing part
6=thread
7=thread top
8=thread flank
9=thread bottom
10=recess
11=wall
12=grip
13=base triangle
14=top of the base triangle
15=chamfered part
16=cutter
17=plug blank
s=screw pitch
h=thread depth
α=profile angle of the thread
β=cone angle of the sealing part
γ=tangent angle
R=radius of curvature
I=length of the sealing part
H=height of the thread
d=outer diameter of the thread
$d_f$=diameter of the front part
$d_H$=outer diameter of the base triangle
$d_i$=inner diameter of the thread

The invention claimed is:

1. A plug (1) for sealing a hole (2) provided in a work piece (3), the plug (1) comprising a front part (4) and a sealing part (5), and a surface hardness, at least of the sealing part (5), exceeding a hardness of the work piece (3),
   wherein the sealing part (5) is conical with an increasing diameter in a direction from the front part (4) toward the sealing part (5),
   the sealing part (5) comprises a cutting thread (6),
   a profile of the thread (6) comprises a sharp tapered top (7), two flat flanks (8), and a bottom (9) of the thread (6), and each of the two flanks (8) intersects and meets with the top (7) along a respective edge,
   the flanks (8) are flat and an angle (α, γ) formed between flanks (8) is between 110-160°, and
   transitions between the flanks (8) and the bottom (9) are smooth.

2. The plug according to claim 1, wherein the flanks (8) of the thread (6) have a curved radius of curvature (R), and the intersection between the flanks (8) of the thread constitutes the top (7) of the thread (6), which is sharp tapered.

3. The plug according to claim 2, wherein the bottom (9) of the thread (6) constitutes an extension of the radius of curvature (R) of the flanks (8) of the thread, whereby the continuous radius (R) extends between two adjacent tops (7) of the thread, that is from tip to tip.

4. The plug according to claim 2, wherein the bottom (9) of the thread (6) comprises a chamfered section (15), a straight part, and a continuation of the radius of curvature (R) of the thread flanks (8) between two adjacent thread tops (7).

5. The plug according to claim 2, wherein a tangent angle (γ), between tangents of the thread flanks (8) at the intersection, is 145°.

6. The plug according to claim 2, wherein a length (I) of the sealing part (5) at least comprises three complete turns of threads (6) so that, following mounting of the plug (1) in the hole (2), the at least three complete turns of threads cut into the work piece (3) and achieve a seal between the plug (1) and a wall (11) of the hole (2).

7. The plug according to claim 1, wherein the flanks (8) of the thread (6) are straight and a profile angle (α) of the thread (6), between the flanks (8) of the thread, is between 110-160°.

8. The plug according to claim 7, wherein the top (7) of the thread is sharp pointed, a real outer diameter (d) of the thread (6) is approximately the same as a distance between the tops of a theoretical so called base triangle (13) of the thread (6), and the top (7) of the thread approximately corresponds to a top (14) of the base triangle (13).

9. The plug according to claim 1, wherein a depth (h) of the thread (6), from the bottom (9) of the thread to the top (7) of the thread, is less than 0.15 mm.

10. The plug according to claim 1, wherein a cone angle (β) of the sealing part (5) is within a range of $0°<β≤6°$.

11. The plug according to claim 1, wherein a depth (h) of the thread (6), from the bottom (9) of the thread to the top (7) of the thread, is between 0.05-0.1 mm.

12. The plug according to claim 1, wherein a length (I) of the sealing part (5) at least comprises three complete turns of threads (6), whereby at least three complete turns of threads cuts into the work piece (3), following mounting of the plug (1) in the hole (2), and achieve a satsfactory seal between the plug (1) and a wall (11) of the hole (2).

13. The plug according to claim 1, wherein the plug (1) comprises a recess (10) provided for engagement with a tool for mounting and dismounting the plug (1).

14. The plug according to claim 1, wherein the plug (1) comprises a grip (12) to assist with gripping by a tool and facilitate mounting and dismounting the plug (1).

15. The plug according to claim 1, wherein the sealing part (5) is connected to the front part (4) and an outer diameter (d) of the thread (6), closest to the front part (4), is equal to a diameter (df) of the front part (4).

16. The plug according to claim 1, wherein the sealing part (5) is connected to the front part (4) and an outer diameter (d) of the thread (6), closest to the front part (4), is smaller than a diameter (df) of the front part (4).

17. The plug according to claim 1, wherein the bottom (9) of the thread (6) comprises a chamfered section (15), a straight part, a chamfering of an imagined continuous radius, and a continuation of the radius of curvature (R) of the thread flanks (8) between two adjacent thread tops (7).

18. The plug according to claim 1, wherein a tangent angle (γ), between tangents of the thread flanks (8) at the intersection, is 145°.

19. The plug according to claim 1, wherein a profile angle (α) of the thread (6), between the flanks (8) of the thread, is preferable 145°.

20. The plug according to claim 1, wherein a cone angle (β) of the sealing part (5) is between $2°≤β≤3°$.

* * * * *